United States Patent [19]
Cappa

[11] 3,985,984
[45] Oct. 12, 1976

[54] RIM FOR A PNEUMATIC TIRE AND A SWITCH DEVICE FOR SIGNALING A CHANGE IN PHYSICAL CONDITIONS IN A PNEUMATIC TIRE MOUNTED ON THE RIM

[75] Inventor: Giulio Cappa, Milan, Italy
[73] Assignee: Industrie Pirelli S.p.A., Milan, Italy
[22] Filed: Aug. 7, 1974
[21] Appl. No.: 495,411

[30] Foreign Application Priority Data
Mar. 23, 1973 Italy.............................. 28118/73

[52] U.S. Cl. ........................... 200/61.22; 29/627; 200/61.25; 340/58
[51] Int. Cl.² .................. H01H 35/00; H05K 3/28; B60C 23/00
[58] Field of Search ........... 200/61.22, 61.25, 83 N; 340/58, 52 F; 317/101 C, 101 CC; 29/627

[56] References Cited
UNITED STATES PATENTS

| | | | |
|---|---|---|---|
| 3,185,785 | 5/1965 | Howard | 200/61.25 |
| 3,614,732 | 10/1971 | Lejeune | 200/61.25 X |
| 3,787,806 | 1/1974 | Church | 200/61.22 X |
| 3,838,316 | 9/1974 | Brown et al. | 317/101 CC X |
| 3,881,170 | 4/1975 | Hosaka et al. | 340/58 X |

*Primary Examiner*—James R. Scott
*Attorney, Agent, or Firm*—Stevens, Davis, Miller & Mosher

[57] ABSTRACT

An electrical device for signaling a change in physical conditions within a vehicle pneumatic tire mounted on a rim has a sensing element containing at least two electrical contacts which are closed or open to the flow of an electrical current depending upon the physical conditions in the tire, a pair of electrodes connected to the contacts and passing through the wall of the rim, an electrical signaling circuit disposed outside the rim, connected with the electrodes and controlled by the position of the two contacts, the electrical circuit being enclosed in a mass of cross-linked synthetic resin to protect it from excessive wear due to dust, rain and mud.

13 Claims, 4 Drawing Figures

RIM FOR A PNEUMATIC TIRE AND A SWITCH DEVICE FOR SIGNALING A CHANGE IN PHYSICAL CONDITIONS IN A PNEUMATIC TIRE MOUNTED ON THE RIM

This invention relates to a rim for pneumatic tires provided with a device for deriving an electrical signal from the inside of the tire which indicates a variation of magnitude in the typical parameters of the tire's physical condition, and, in particular, indicates the achievement of stated critical values, for instance a drop of pressure or an increase of temperature over a preestablished limit.

The problem to be solved consists in bringing an electrical signal generated inside a rotating body outside the latter and to an apparatus which is stationary with respect to the body.

The most obvious manner to obtain this, namely the use of a slip ring, is not applicable in this case for several practical reasons. For instance, because the rotating body is a wheel travelling on a road, the slip ring generates a significant and widely variable contact resistance due to the dirty condition of the road and the power of the involved signals is very low.

Recently, some systems intended to provide signals without the use of slip rings and without any mechanical connection between fixed and moving elements have been proposed. For example, inductive connections generated between coils, some of which are fast with the wheel and others with the frame of the vehicle have been proposed.

One method of this type is illustrated in the Italian Pat. No. 949,974.

The heretofore proposed devices, however, have the disadvantage that because of the way in which the electrical circuit is fixed to the rim, it is exposed to impact and to excessive wear due to dust, rain and mud which impair its reliability and also its mechanical resistance in a relatively short time.

It is therefore an object of the present invention to provide an electrical circuit and a type of connection which are particularly resistant to impact and fouling by dust, rain and the like to eliminate the above disadvantages. Another object of the invention is to provide a process for making a rim for mounting a pneumatic tire on a vehicle wheel having electrical means for indicating variation within the tire of a physical condition to a predefined limit.

Other objects will become apparent from the following description with reference to the accompanying drawing wherein FIG. 1 is a fragmentary partial cross-section through a vehicle wheel, rim, tire and brake assembly;

The foregoing objects and others are accomplished in accordance with the invention by providing a rim for pneumatic tires provided with an electrical device to indicate the achievement of a limit value of a physical magnitude inside the tire, which comprises:

a. a sensing element containing at least two electric contacts which invert their closing or opening position when said limit is reached;

b. at least a pair of electrodes connected to said contacts and passing through the thickness of the rim;

c. an electrical signalling circuit disposed outside the rim, connected with the electrodes and controlled by the condition of the contacts, the rim being characterized in that at least the electrical circuit is embedded in a homogeneous mass which adheres to the external surface of the rim.

The invention also provides a process for the manufacture of a rim which comprises the steps of securing a sensing element and an electrical circuit to a rim and is characterized in that it also comprises the steps of enclosing at least the electrical circuit in a space defined on one wall by the external surface of the rim and on the other walls by a container, and then injecting a homogeneous mass of a material able to set and simultaneously to adhere to the surface of the rim.

The present invention further provides a process for the manufacture of a rim, comprising the steps of securing a sensing element and an electric circuit to a rim, characterized in that it also comprises the steps of pre-forming a block of synthetic material containing at least the electrical circuit, of spreading on the surface of the block intended to come into contact with the rim a synthetic material consistent with that forming the block and cross-linkable by compression, and of applying the block to the rim, pressing the block until cross-linking of at least the synthetic material in contact with the rim, so as to obtain a bond between the block and the rim.

The invention will be better understood with reference to the accompanying drawing, given only by way of non-limiting examples.

Figure 1:
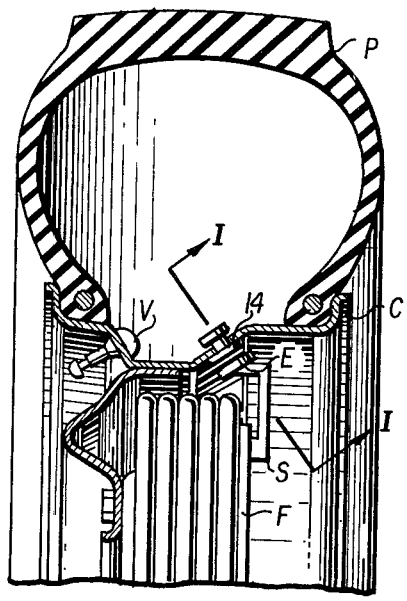

In particular, FIG. 1 represents a section of a wheel provided with a tire P of the "tubeless" type, taken along a plane through the axis of rotation of the wheel and passing through that point of the rim C where the apparatus provided by the invention is secured. More specifically, FIG. 1 shows a tire P, mounted on a rim C, assembled on a brake drum F, the latter being illustrated in elevation. A conventional inflation valve V (on the external side of the rim C with respect to the vehicle) and the apparatus provided by the invention (on the internal side) are secured to rim C in holes through the sides of the rim channel. The apparatus thus provides an element 1 disposed inside the channel and element 14 disposed on the external surface of the rim and connected through a hole to disk-like element 1.

A bracket S is firmly secured to a fixed part of the brake drum. Bracket S carries an element E which, for a given position of the wheel, as represented in FIG. 1, is frontally facing the element 14. Element 14 is rigidly secured to the wheel. The two elements 1 and 14 are two parts of an electromagnetic circuit which, in a given situation, are inductively connected, transferring an electric signal from the inside of the wheel to the fixed external alarm system (i.e. a buzzer or light).

The device of the present invention has been cut along a plane I—I in FIG. 1. The plane divides the device into two symmetrically equal parts, and FIGS. 2 and 3 show two variations of the so obtained sections.

It is also to be noted that the apparatus according to the invention and the inflation valve V are situated on the same plane only for the sake of clearness. Actually, there is no need for such an arrangement; on the contrary, for a good balance of the wheel, it is preferable to arrange them in offset relationship.

Figure 2:
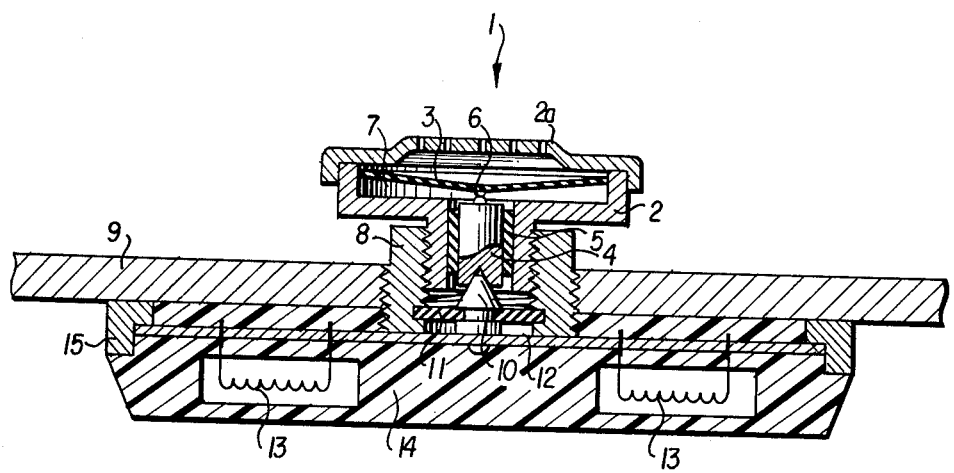
FIG. 2 is an enlarged fragmentary section taken along the line I—I of FIG. 1 of one preferred embodiment of the invention.
Figure 3:
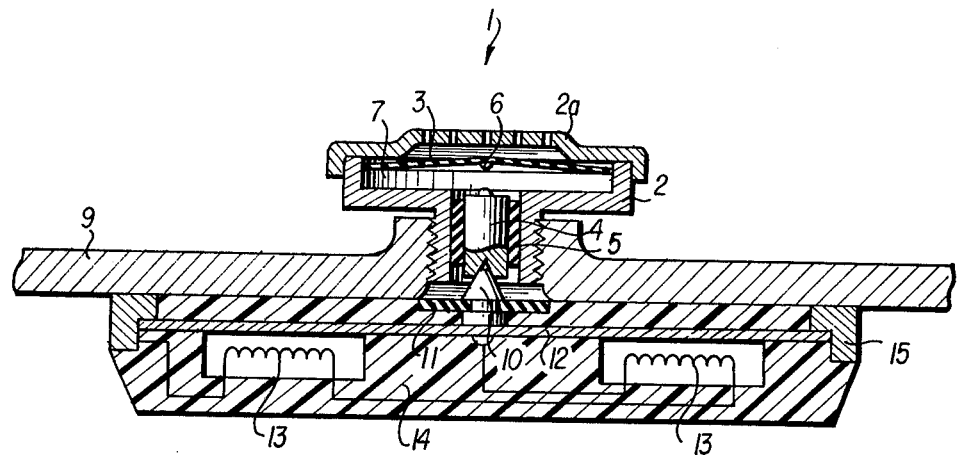
FIG. 3 is an enlarged fragmentary section taken along the line I—I of FIG. 1 of another embodiment of the invention.

FIG. 2 shows in detail the device concerning the indication of pressure variations, cut along plane I—I, in a first preferred embodiment.

The apparatus includes a conventional sensing element 1, having a box or cup-shaped housing 2 having an opening therein with an external lid 2a, appropriately perforated, an elastic membrane 3 disposed within a cavity in housing 2, and a counterpoint 4 disposed in the flanged opening in housing 2. Counterpoint 4 is separated from the wall of the tube by an air tight, electrically insulating material 5.

Both the membrane 3 and the counterpoint 4 are provided with an electrical contact 6. The cavity 7 defined by the membrane 3, the base of member 2 and the counterpoint 4 contains a compressed gas, having a stated pressure depending on the value of the pressure it is wished to indicate.

The gas can conveniently be air or any other gas, as for instance nitrogen, as no particular characteristics are required for the gas except that it should not corrode the materials forming element 1.

Member 2 is screwed in a bushing 8, which in turn is threadably secured in a hole in the wall 9 of the rim C.

A coaxial member 10 is disposed in bushing 8 in spaced relation with the walls thereof by means of an electrically insulating air-tight material 11. The point of member 10 comes into contact with the counterpoint 4 of the sensing element 1 when the latter is screwed in the bushing 8.

Member 10 and the body of bushing 8 are in metal-to-metal contact with an electrical circuit. In this embodiment the electrical circuit is printed on a base or board 12. Two coils 13 are disposed on said base 12. Coils 13 and the other components of the circuit are electrically connected to member 10. The contact point of member 10 is held in the conical opening in the base of member 4 to form an electrical contact. Circuit board 12 is disposed against bushing 8. Bushing 8 and the point of member 10 constitute the pair of electrodes mentioned at point (b) above of the description of the present invention.

The base 12, at least with its two shorter sides, is disposed on two metal flanges 15 which are welded to the rim C. Base 12 is embedded together with all the other parts of the circuit in a homogeneous mass 14 of injectable synthetic material. This synthetic resin is cross-linkable at room temperature and is prepared by mixing two components together. The synthetic material has suitable characteristics for use in intimate contact with electrical circuits, as for instance an epoxy resin, a polyester or polyurethane resin and is adapted to be perfectly bonded to the rim in order to form a single unit by injection molding.

The flanges 15, besides facilitating the embedding process, as explained below, provide further mechanical protection for the finished block in use.

It is now clear how the present invention solves the problems cited at the beginning of this description and is advantageous over similar systems used heretofore. The block, firmly anchored to the rim, protects in a very efficient manner the electric circuit against vibrations, accidental impacts, dust, moisture and all other causes which would tend to shorten the life of the apparatus and impair its operation. At the same time the block ensures that a perfect air-tight fit is obtained in the hole, even if the gasket 11 should deteriorate in course of time.

As regards the operation of the apparatus, it is noted that the sensing element 1 is merely a switch which controls the electrical circuit of which it is a part.

In fact, still with reference to this particular embodiment, as long as the pressure acting outside the membrane 3, i.e. (owing to the position of the box and of its relative perforated lid) the pressure existing inside the tire is greater than that of the gas contained in the cavity 7, membrane 3 takes a profile with a concavity directed upwardly when positioned as shown in the drawing, which brings the electric contacts 6 in mutual contact to close the electrical circuit. The contact is released upon deflation of the tire to the point that the gas pressure inside the box is greater than that contained in the tire and the concave shape of membrane 3 is inverted and contacts 6 are separated.

It is to be understood that the type of electrical circuit and its operation can be varied and conventionally known circuits can be used.

Another preferred embodiment, for the indication of temperature variations, is shown in FIG. 3, having the same numerical references as FIG. 2.

The membrane 3 is here a metal lamina, of appropriate material, with its convexity directed towards the outside, and provided in the cavity 7 with an electrical contact 6. Normally contact 6 is touching the contact on counterpoint 4 but, owing to a pre-established increase of temperature, the lamina formed by a material having a higher coefficient of thermal expansion than that of the supporting base 2, expands, thus increasing its concavity and interrupting the electrical contact. In this embodiment bushing 8 is formed by an appropriate drawing of the wall 9 of rim C and threading the inner wall. Sensing element 1, described above, is threadably secured in member 8 integral with wall 9 of rim C.

In this embodiment member 10, with its spacer 11, is mounted on a base 12 on which are also mounted the components of the electrical circuit including also coils 13, which are electrically connected together in a conventional way by means of a conductive wire.

Of course, board 12 may be the printed circuit of FIG. 2, with the elimination of the connecting conductors. In this case, moreover, the same rim C, through the bushing 8 and the flanges 15, acts as an electrode in association with the member 10.

Also in this embodiment at least the part of the circuit comprising the base and the electronic components is embedded in a homogeneous mass 14, which adheres perfectly to the rim like that described above.

Figure 4:
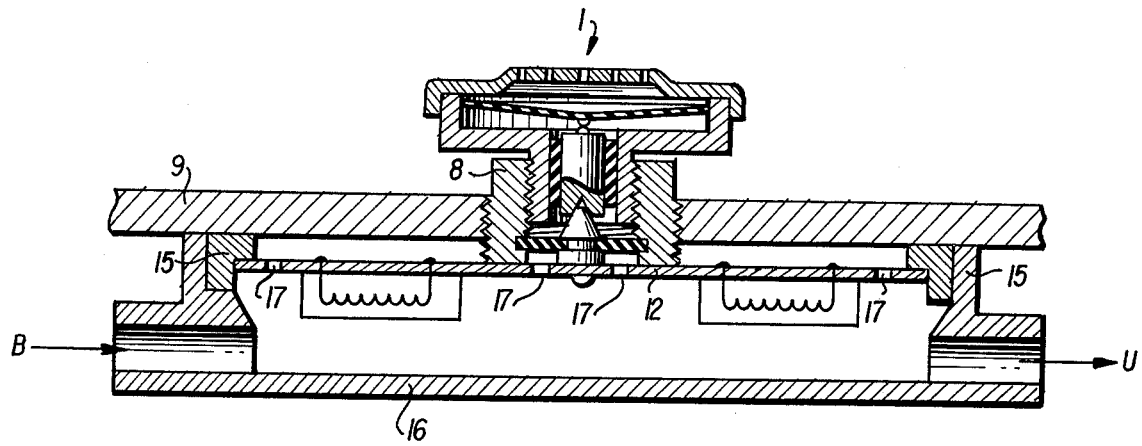
FIG. 4 is a fragmentary section which illustrates a process of the invention.

Turning now to FIG. 4, the above mentioned embedding process with respect to the apparatus illustrated in the preferred embodiment of FIG. 2 will be explained.

At first, the base 12 is positioned in abutment with members 15, and secured thereto by conventional methods such as with screws, joints, welding or the like.

Subsequently the bushing 8 is tightened and, inside it, is tightened the box 1, so as to establish all of the electrical contacts necessary for completing the circuit.

The circuit is then enclosed in a container 16 appropriately designed to fit with the wings 15 and the curvilinear outer surface of the wall 9, and the container is locked in the desired position on the rim by conventional means.

Now the synthetic resin is injected through the admission perforation B. The resinous material fills all the cavities existing in the box-like element, passing also through the base 12, provided for this purpose with appropriate holes 17, while air is evacuated through suitable vents, for instance the discharge duct U, indicated in the preferred embodiment shown in FIG. 4, which in another preferred embodiment is connected with a vacuum pump. The injected material adheres closely to the surface of the rim C and of the bushing 8 and converts it into a single solid block.

During the process, use is made of possible thermal treatments or other treatments required by the technology of the synthetic resin.

The setting of the mass can take place in a short time or, vice versa, in a considerably longer time, according to the type of material used. In the latter case, for instance, when a cross-linkable material is chosen, the container 16 must be left mounted and the rim must be allowed to rest until complete cross-linking of the mass.

Of course, in all cases, when the material is settled, the container is removed and the rim, at least in this respect, is ready for use.

Another preferred process, especially for the embodiment of FIG. 3, involves preparing separately, in a container of appropriate shape, the block 14 containing also the electrical circuit, and subsequently in positioning it on the rim and effecting cross-linking of the resin with pressure. Any suitable synthetic resin which is cross-linkable by pressure at room temperature may be used for this purpose such as for example, an epoxy or polyurethane resin. A very strong bond to the rim is obtained in this way with results analogous to those obtained with the already described injection process.

In this case the rim may be devoid of the flanges 15, which are not strictly indispensable.

Although the invention is described in detail for the purpose of illustration it is to be understood that such detail is solely for that purpose and that variations can be made therein by those skilled in the art without departing from the spirit and scope of the invention except as it may be limited by the claims.

I claim:

1. In a device for detecting when a critical value of the physical condition within an inflated vehicle tire casing mounted on a rim of a vehicle has been overcome, said rim having an opening therethrough, said device comprising an electromagnetic circuit having
   a sensing means disposed in the tire casing and connected to the said opening, said sensing means having a body, a deformable element and two electrical contacts, one of which is fast with the body while the other is applied to the deformable element, said deformable element being adapted to have two different shapes when the physical condition changes from one value to another value across the critical value, said electrical contacts being contacted when said deformable element has one of the said shapes but not when the element has the other shape,
   an electrical circuit disposed on said rim adjacent to the opening and on the wall of the rim outside the said casing, said electrical circuit being embedded in a resinous adhesive material which secures said circuit to the rim, said electrical circuit being inductively coupled to a means for signaling said overcoming of the critical value responsive to current flow in said electrical circuit, and
   conductor means to electrically connect two suitable points of said electrical circuit with said two electrical contacts of the sensing means,
   the improvement wherein
   said electrical circuit is arranged exactly corresponding to the opening on the rim so that said opening is completely covered, whereby said resinous adhesive material fills the opening in an air-tight manner and insulates said sensing means and said conductor means from the outside of the tire casing and rim assembly.

2. A device as in claim 1, wherein said resinous adhesive material is a cross-linked and injection moldable synthetic resin selected from the group consisting of an epoxy resin, a polyester and polyurethane resin.

3. A device as in claim 1, wherein means are provided in said opening which obstruct the way, whereby said crosslinked synthetic resin cannot come into contact with said sensing means 4. A device as in claim 1, wherein said sensing means are fixed to the rim by screwing in a bushing which is screwed in the opening of said rim, said bushing being also fastened to the rim by at least a partial incorporation in said cross-linked and injection moldable synthetic resin.

5. A device as in claim 1, wherein said electrical circuit is a printed circuit on which is fixed a tubular member disposed in said opening, said member having a contact point able to come into contact with one of the electrical contacts of said sensing means, said member being spaced and electrically insulated from the walls of said opening, the electrical connection between said electrical circuit and the other contact of said sensing means being made through the metallic connection between the body of the rim and the sensing means.

6. A device as in claim 5, wherein said means which insulate the tubular member from the walls of said opening also obstruct the way in the opening of the rim.

7. A device as in claim 1, wherein said sensing means are fixed to the rim by screwing on the walls of the opening in said rim, said opening having funnel-shaped walls.

8. A process for the manufacture of the rim of claim 1, comprising the steps of securing a sensing element and an electrical circuit to a rim by enclosing at least the electrical circuit in a space defined on a wall by the external surface of the rim and on the other walls by a container, and then injecting a homogeneous mass of a material adapted to set and simultaneously to adhere to the surface of the rim.

9. The process of claim 8 wherein the homogeneous material is a cross-linkable resin and, after injection, a sufficient time is allowed to cross-link the material.

10. A process for the manufacture of a rim as in claim 1, having a sensing element and an electrical circuit secured to a rim which comprises the steps of pre-forming a block of synthetic material, containing at least the electrical circuit, of spreading over the surface of the block intended to come into contact with the rim a synthetic material consistent with that forming the block and cross-linkable by compression, and of applying said block to the rim, and exerting for the necessary time a pressure able to originate the cross-linking of at least the material in contact with the rim, so as to obtain a bonding between said block and said rim.

11. A process as in claim 10, characterized in that the synthetic material cross-linkable by compression is selected from the group consisting of an epoxy resin, a polyester resin and a polyurethane resin.

12. A device for detecting a change in pressure in the cavity of an inflated vehicle tire mounted on a rim, said rim having an opening therethrough, said device comprising
 a cup-shaped housing having an open end facing the cavity in the tire and a base opposite the open end having an opening therethrough, and a tubular member fastened to the base around the said opening therein and extending into the opening through the rim, and a porous lid over said open end of the housing, said housing and lid enclosing a cavity,
 a cylindrical member disposed in said tubular member having a contact point exposed to the cavity enclosed by the lid and housing,
 means for insulating said cylindrical member from the tubular member,
 an electrical circuit including a pair of coils disposed alongside the rim on its side opposite from the tire cavity,
 means for electrically connecting the said cylindrical member to the said electrical circuit,
 a flexible member disposed across the cavity dividing it into a first space adjacent to the lid and a second space adjacent to the cylindrical member, a contact on said flexible member disposed to touch the contact point on the cylindrical member when the flexible member is flexed against the cylinder,
 a gas under pressure in the space between the flexible member and the contact point on the cylindrical member, said flexible member being responsive to fluid pressure whereby it flexes to contact the contact on the cylindrical member when the pressure in the tire exceeds the pressure in the space between the flexible member and the cylindrical member and flexes away from the contact point on the cylinder when the fluid pressure in the space between the flexible member and cylindrical member is greater than the pressure in the tire,
 a cross-linked resinous mass enclosing the said electrical circuit, sealing the said opening in the rim and securing the detecting device to the rim, and
 means fixed against rotation and disposed where it will receive an electrical signal from the said electrical circuit for transferring the signal to an alarm device.

13. A device for detecting a change in temperature within a cavity of a tire casing mounted on a vehicle rim, said rim having an opening therethrough, said device comprising an electromagnetic circuit comprising
 a cup-shaped housing member enclosing a space and disposed in the tire casing cavity, said member having a base and an opposite open end facing the cavity, said base having an opening therein,
 a tubular member secured to the base about the opening therein and extending into the opening in the rim,
 a cylindrical member disposed in the tubular member and having an electrical contact point facing the space enclosed by the housing, means for insulating the cylindrical member from the tubular member,
 an electrical circuit including a pair of coils disposed alongside of the rim opposite from the side of the rim facing the base of the housing,
 means for electrically connecting the cylindrical member to the said electrical circuit,
 a flexible member disposed in the space enclosed by the housing which contracts and expands with change in temperature, said flexible member having an electrical contact point which is in contact with the contact on said cylindrical member when the flexible member is in one state of expansion or contraction and is not in contact with the contact on said cylindrical member when in the opposite state,
 a protective cross-linked resinous mass enclosing said electrical circuit and sealing said opening in the rim, and
 means fixed against rotation and disposed where it will receive an electrical signal from the said electrical circuit for transferring the signal to an alarm device.

\* \* \* \* \*